United States Patent
Lee et al.

(10) Patent No.: US 8,295,180 B2
(45) Date of Patent: Oct. 23, 2012

(54) QUALITY OF SERVICE AWARE RATE THROTTLING OF DELAY TOLERANT TRAFFIC FOR ENERGY EFFICIENT ROUTING

(75) Inventors: Uichin Lee, Red Bank, NJ (US); Ivica Rimac, Tinton Falls, NJ (US); Volker Friedrich Hilt, Middletown, NJ (US)

(73) Assignee: Alcatel Lucent, Paris (FR)

( * ) Notice: Subject to any disclaimer, the term of this patent is extended or adjusted under 35 U.S.C. 154(b) by 313 days.

(21) Appl. No.: 12/794,268

(22) Filed: Jun. 4, 2010

(65) Prior Publication Data
US 2011/0299392 A1 Dec. 8, 2011

(51) Int. Cl.
*H04L 12/26* (2006.01)
*H04L 12/28* (2006.01)

(52) U.S. Cl. ........................ 370/235; 370/254

(58) Field of Classification Search .......... 370/230–235, 370/252–255, 391, 401, 477
See application file for complete search history.

(56) References Cited

U.S. PATENT DOCUMENTS

| | | | |
|---|---|---|---|
| 5,978,356 A * | 11/1999 | Elwalid et al. | 370/230 |
| 7,990,853 B2 * | 8/2011 | Brolin | 370/229 |
| 2004/0013089 A1 * | 1/2004 | Taneja et al. | 370/235 |
| 2004/0170127 A1 * | 9/2004 | Tanaka | 370/235 |
| 2004/0202175 A1 | 10/2004 | Horioka et al. | |
| 2006/0218281 A1 | 9/2006 | Allen | |
| 2007/0058544 A1 * | 3/2007 | Kim et al. | 370/230 |
| 2008/0130495 A1 * | 6/2008 | Dos Remedios et al. | 370/230 |

OTHER PUBLICATIONS

International Search Report dated Jul. 28, 2001 for corresponding PCT Application No. PCT/US2011/038713.

\* cited by examiner

*Primary Examiner* — Hong Cho
(74) *Attorney, Agent, or Firm* — Kramer & Amado, PC

(57) ABSTRACT

The invention is directed to energy-efficient network processing of delay tolerant data packet traffic. Embodiments of the invention determine if an aggregate of time critical traffic flow rates and minimum rates for meeting QoS requirements of delay tolerant traffic flows exceeds a combined optimal rate of packet processing engines of a network processor. In the affirmative case, embodiments set the processing rate of individual packet processing engines to a minimum rate, such that the cumulative rate of the packet processing engines meets the aggregate rate, and schedule the delay tolerant flows to meet their respective minimum rates. Advantageously, by throttling the processing rate of only delay tolerant traffic, energy consumption of network processors can be reduced while at the same time QoS requirements of the delay tolerant traffic and time critical traffic can be met.

20 Claims, 3 Drawing Sheets

QUALITY OF SERVICE AWARE RATE THROTTLING OF DELAY TOLERANT TRAFFIC FOR ENERGY EFFICIENT ROUTING

FIELD OF THE INVENTION

The invention is directed to data packet networks, particularly to processing data packets in a network in a manner that respects quality of service (QoS) commitments of certain data packet traffic, referred to herein as a QoS-aware manner, while at the same time addressing energy efficiency of network processors handling the data packet traffic.

BACKGROUND OF THE INVENTION

The vast majority of current Internet usage consists of content being disseminated from a source to a number of users. To meet growing demands, service providers (e.g., Google) are ushered to invest in large data centers with hundreds of thousands machines distributed across different geographic regions. Similarly, network providers have been increasing network capacity by deploying a large number of high-speed routers and fiber cables. Networking devices such as servers, core/edge routers, and access devices involved in this large scale content delivery consume significant energy; for instance, the U.S. Environmental Protection Agency (EPA) estimates that data centers could consume 100 billion kilowatt hours at a cost of $7.4 billion per year by 2011.

Given this large consumption of energy, it would be desirable to focus on energy efficiency of modern high-speed routers that play a significant role in that content delivery chain. A modern router is typically equipped with hundreds of network processors for fast processing of data plane tasks (e.g., routing, packet classification, encryption, QoS, etc). Since the energy consumption of those network processors (NPs) dominates that of packet transport over the wires, one way of reducing energy consumption is to dynamically provision network processors on the basis of time varying traffic volume demands. For instance, if the utilization of a router is 70% to route a current volume of traffic, the router configures its processing rate as 70% of its peak rate. To this end, modern network processors employ Dynamic Voltage Scaling (DVS) that allows NPs to slow down their operating frequency (or rate) and lower their operating voltage to save energy.

However, current DVS techniques do not take into account QoS commitments of the traffic being routed, which commitments if not met can affect a network providers' revenues. Therefore, it would be desirable to have a means of achieving greater energy efficiency in network routers while at the same time respecting QoS commitments, such as service level agreements (SLAs).

SUMMARY

Embodiments of the invention are directed to energy-efficient network processing of delay tolerant data packet traffic.

Some embodiments of the invention determine if an aggregate of time critical traffic flow rates and minimum rates for meeting QoS requirements of delay tolerant traffic flows exceeds a summation of respective optimal rates for energy efficiency of packet processing engines in a network processor. In the affirmative case, the embodiments set the processing rate of individual packet processing engines to respective minimum processing rates, such that the cumulative rate of the packet processing engines meets the aggregate rate, and schedule the delay tolerant flows to meet their respective minimum rates.

Some embodiments of the invention in the negative of the foregoing condition determine and subsequently use a minimum number of packet processing engines required to meet a total of the time critical traffic flow rates and rates of the delay tolerant flows.

Advantageously, unlike dynamic resource provisioning methods that simply adjust processing rates based on current traffic volume demands, by throttling the processing rate of only delay tolerant traffic to result in an energy-efficient rate of the packet processing engines that are processing the aggregate traffic, energy consumption of network processors can be reduced while at the same time QoS requirements of the delay tolerant traffic and time critical traffic can be met.

According to an aspect of the invention a method is provided of controlling a processing rate used in a network processor having a plurality of packet processing engines. The method comprises the steps of: determining an aggregate rate of time critical flows received by the network processor; determining an aggregate minimum rate that will meet respective quality of service requirements of all delay tolerant flows received by the network processor; summing the aggregate rate of time critical flows and the aggregate minimum rate to obtain a summed rate; totaling respective optimal rates for energy efficiency of the packet processing engines to obtain a cumulative optimal rate; comparing the summed rate to the cumulative optimal rate; determining, responsive to the summed rate being greater than the cumulative optimal rate, a respective minimum processing rate for each packet processing engine such that a summation of the minimum processing rates is greater than or equal to the summed rate; and scheduling processing of the delay tolerant flows by the packet processing engines to meet the respective quality of service requirements of the delay tolerant flows.

Advantageously, the method may further include the steps of: determining an aggregate rate of the time critical flows and the delay tolerant flows to obtain an aggregate input rate; determining, responsive to the summed rate being less than or equal to the cumulative optimal rate, a minimum subset of packet processing engines such that the aggregate input rate is less than or equal to a summation of the respective optimal rates of the packet processing engines of the subset; and scheduling processing of the delay tolerant flows and the time critical flows on only packet processing engines of the subset.

According to another aspect of the invention a rate controllable network processor is provided. The network processor includes a plurality of packet processing engines and a rate estimator for determining from a flow of IP packets received by the network processor: an aggregate rate of time critical flows received by the network processor, and an aggregate minimum rate that will meet respective quality of service requirements of delay tolerant flows received by the network processor. The network processor also includes a rate controller for determining a respective minimum processing rate for each packet processing engine such that a summation of the minimum processing rates is greater than or equal to a summation of the aggregate rate of time critical flows and the aggregate minimum rate; and a dispatcher for scheduling processing of the delay tolerant flows by the packet processing engines to meet the respective quality of service requirements of the delay tolerant flows, wherein each packet processing engine is operable to process packets at its respective minimum processing rate.

Advantageously, the rate estimator may additionally be operable to determine an aggregate input rate comprising a summation of the aggregate rate of time critical flows and an aggregate rate of the delay tolerant flows and to sum the aggregate rate of time critical flows and the aggregate minimum rate to obtain a summed rate. The rate controller may additionally be operable to obtain respective optimal rates for energy efficiency of the packet processing engines and to total respective optimal rates for energy efficiency of the packet processing engines to obtain a cumulative optimal rate, and to determine, responsive to the summed rate being less than or equal to the cumulative optimal rate, a minimum subset of packet processing engines such that the aggregate input rate is less than or equal to a summation of the respective optimal rates of the packet processing engines of the subset. The dispatcher may additionally be operable to schedule processing of the delay tolerant flows and the time critical flows on only packet processing engines of the subset.

According to another yet aspect of the invention a controller for a network processor having a plurality of packet processing engines is provided. The controller includes a rate estimator for determining from a flow of IP packets received by the network processor: an aggregate rate of time critical flows received by the network processor, and an aggregate minimum rate that will meet respective quality of service requirements of delay tolerant flows received by the network processor. The controller also includes: a rate controller for determining a respective minimum processing rate for each packet processing engine such that a summation of the minimum processing rates is greater than or equal to a summation of the aggregate rate of time critical flows and the aggregate minimum rate; and a dispatcher for scheduling processing of the delay tolerant flows by the packet processing engines to meet the respective quality of service requirements of the delay tolerant flows.

BRIEF DESCRIPTION OF THE DRAWINGS

The foregoing and other objects, features and advantages of the invention will be apparent from the following more particular description of the preferred embodiments, as illustrated in the appended drawings, where.

In the figures like features are denoted by like reference characters.

DETAILED DESCRIPTION

Embodiments of the invention are directed to energy-efficient network processing of delay tolerant packet data traffic. An example of such traffic is delay tolerant bulk data (DTB), which is applicable to a wide range of delay tolerant content delivery applications such video delivery (NetFlix), scientific data exchanges (high resolution images), data center synchronization, etc. Unlike existing dynamic resource provisioning methods which adjust processing rates based on the current demands, the invention intentionally throttles DTB traffic (yet satisfies application-level QoS) to lower the overall aggregate data rate in the intermediate routers. As a result, we can decrease the operating voltages of network processors, thereby significantly reducing energy consumption.

Embodiments of the invention find application in modern high-speed routers which are typically equipped with hundreds of network processors for fast processing of data plane tasks.

Figure 1:
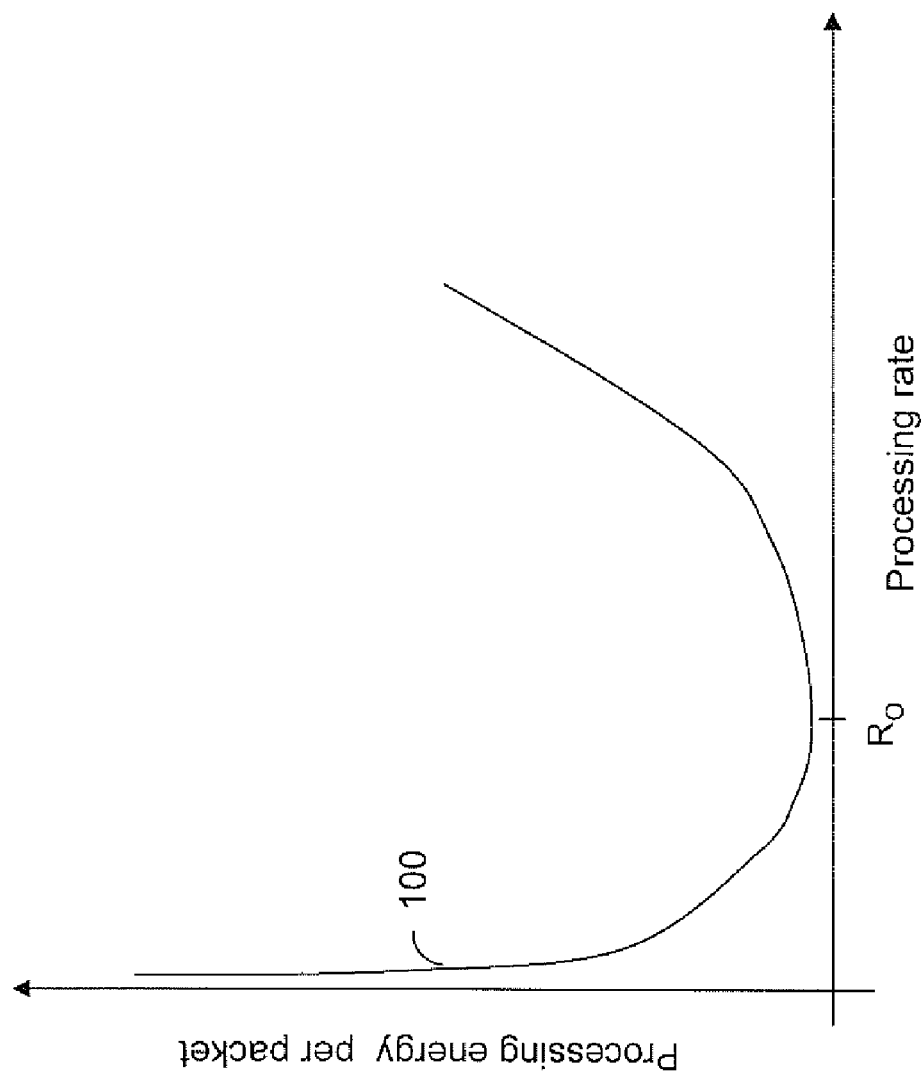
FIG. 1 illustrates a power profile of a single packet processing engine.

FIG. 1 is a graph of a power profile 100 of a single packet processing engine (PPE), of which several hundred could be employed by a typical network processor. The graph displays the processing energy per processed packet versus the processing rate. Here, we see that due to the rate independent power Pw, the power profile 100 has a minimum energy per processed packet at an optimal rate $R_O$ below which no energy saving can be achieved. We conclude that this optimal rate $R_O$ consumes the least energy for forwarding a packet. Through measurements, we can find the optimal rate $R_O$ for each PPE.

For a given router, its aggregated incoming traffic is composed of two types of traffic: time critical and delay tolerant packets. The aggregated rate denoted as $R_A$ is the sum of (1) the rate of time critical packets denoted as $R_T$ and (2) the rate of delay tolerant packet denoted as $R_D$.

For a given router, we can measure the aggregated rate of delay tolerant traffic $R_D$. However, maintaining per flow information may be cumbersome at core routers. To address this problem, we propose to include a flow's required minimum rate in one or more of the flow's packets. For example, ingress routers would insert this information in the packet header, or if not available at the ingress router it could be otherwise inserted at another router, access device, host node, etc. Additionally, this per packet rate information can be augmented with fair rate information as in Core-Stateless Fair Queuing (CSFQ) algorithm so that we can support fair bandwidth scheduling in the intermediate routers.

Figure 2:
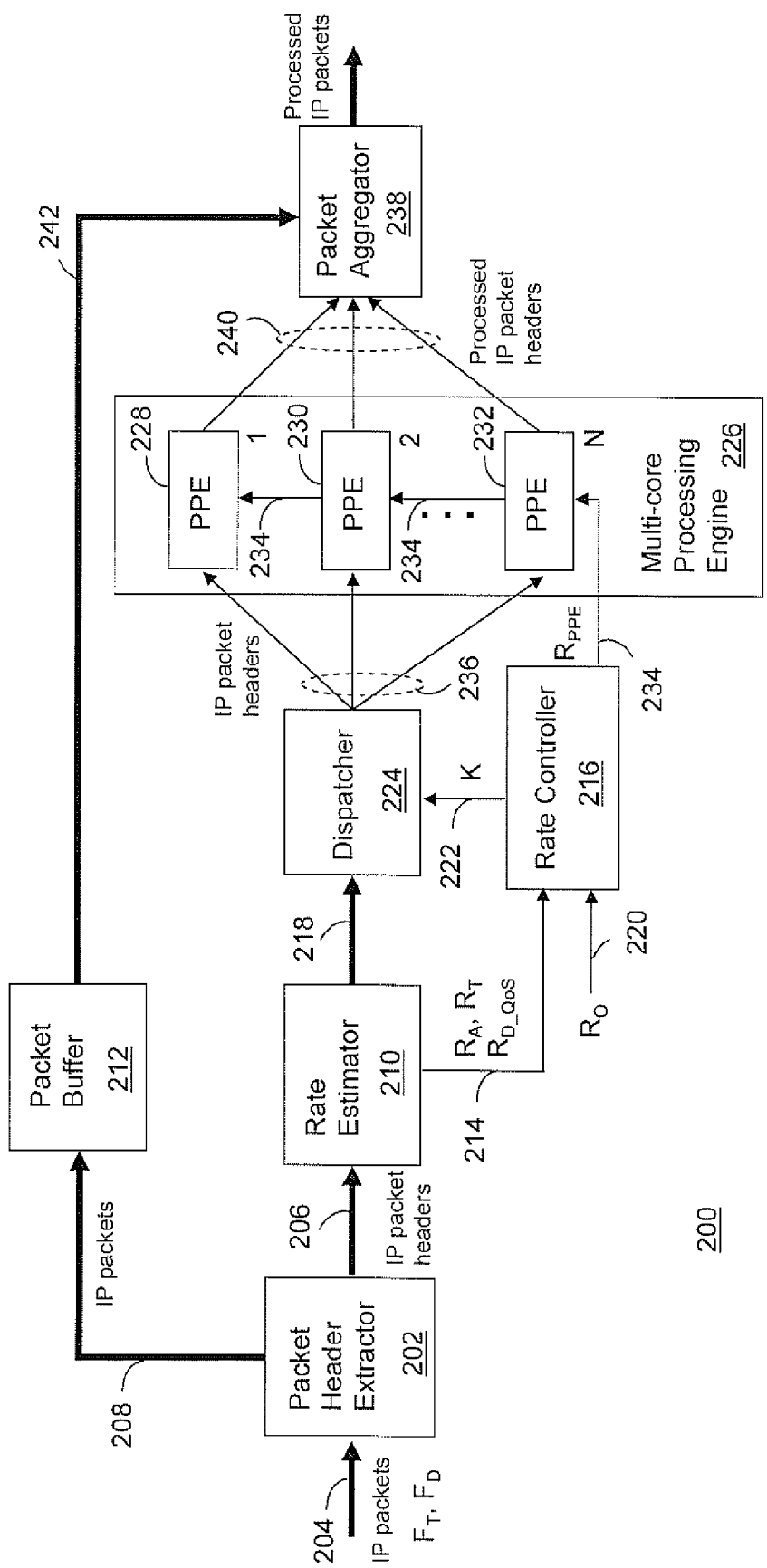
FIG. 2 illustrates a rate controllable network processor according to an embodiment of the invention.

FIG. 2 depicts a rate controllable network processor 200 according to an embodiment of the invention. The network processor 200 includes a packet header extractor 202 that receives an input flow 204 of IP data packets, extracts the IP headers of those packets, and outputs a first flow 206 of the extracted IP packet headers to a rate estimator 210 and a second flow 208 of the IP packets to a packet buffer 212. The rate estimator 210 and packet buffer 212 are respectively connected to the packet header extractor 202 for this purpose. The input flow 204 may include one or more flows of time critical data packet traffic $F_T$ and one or more flows of delay tolerant data packet traffic $F_D$.

The rate estimator 210 receives the first flow 206 of extracted IP headers, estimates an aggregate rate $R_A$ of the first flow 206 using the extracted IP headers, which includes headers of time critical $F_T$ and delay tolerant flows $F_D$. The aggregate rate $R_A$ is determined using a time window exponential moving average, for example a window in the range of 10 milliseconds to 2 seconds is used. A sum of packet sizes, as specified in their respective headers, of packets arriving during the time window divided by the duration of the time window provides a sample aggregate rate, which sample is averaged with other such samples, taken periodically and each having a time-variant weighting for the purpose of the calculation, to obtain an exponential moving average of the aggregate rate $R_A$. Similarly, an exponential moving average of just the time critical flows aggregate rate $R_T$ is calculated.

It should be noted that functionality performed by the packet header extractor 202 could be included in the rate estimator 210, such that the rate estimator performs its aforementioned functions on the input flow 204 of IP data packets received by the network processor 200.

The rate estimator 210 also determines a minimum rate $R_{D\_QoS}$ required to meet QoS commitments on delay tolerant flows $F_D$. This determination is made by reading a minimum rate indication from the extracted headers of each delay tolerant flow $F_D$, and summing these rate indications to obtain the minimum rate $R_{D\_QoS}$. The Type-of-Service byte in the IP header is used for providing the minimum rate indications in the IP headers. For example, by using a floating point representation with four bits for mantissa and four bits for exponent, any rate between 1 Kbps and 65 Mbps can be represented with an accuracy of 6.25%. Other ways of providing the minimum rate indications are to use an IP option in the case of IP version 4 (IPv4), or a hop-by-hop extension header in the case of IP version 6 (IPv6).

The minimum rate $R_{D\_QOS}$ is kept current by tracking all of the delay tolerant flows being processed by the network processing 200, for example in a list or table with the corresponding minimum rate indication associated with each such flow. As data packets of new delay tolerant flows are received by the network processor 200, or data packets of existing flows cease to be received by the network processor 200, this tracking mechanism is updated to reflect such changes and the minimum rate $R_{D\_QOS}$ is recalculated accordingly. Any delay tolerant flow that has been inactive for at least a duration of time equal to the inverse of its minimum rate indication, for example as would be the case if the network processor 200 did not receive a new packet from that flow for that duration, will have its minimum rate indication excluded from a subsequent recalculation of the minimum rate $R_{D\_QOS}$, which recalculation would be triggered by detection of such inactivity by the rate estimator 210.

The rate estimator 210 provides the aggregate rate $R_A$, the time critical flows aggregate rate $R_T$, and the minimum rate $R_{D\_QOS}$ to a rate controller 216 via a connection 214 thereto and forwards the extracted IP packet headers to a dispatcher 224 via a connection 218 between the dispatcher 224 and rate estimator 210.

The rate controller 216 has means 220 for obtaining the optimal rate $R_O$. Such means 220 includes reading the value of the optimal rate $R_O$ from a memory, wherein the value has been stored there and determined either manually through energy utilization measurements over a range of processing rates or automatically via a like procedure, and circuitry internal or external to the network processor 200 for determining the optimal rate $R_O$ of packet processing engines used by the network processor.

The rate controller 216 has a connection 222 to the dispatcher 224 and a connection 234 to a multi-core processing engine 226. The multi-core processing engine has a plurality of input connections 236 to the dispatcher for receiving IP packet headers there from, and a plurality of output connections 240 to a packet aggregator 238 for transmitting processed IP packet headers thereto. The multi-core processing engine 226 includes a plurality N of packet processing engines (PPE) of which a first PPE 228, a second PPE 230, and an Nth PPE 232 are shown in the figure. The PPEs 228 to 232 are configured in parallel for the purpose of processing data packet headers received by the multi-core processing engine 226. Each PPE is coupled to a respective connection of the plurality of input connections 236 and to a respective connection of the plurality of output connections 240. Each PPE has an input for receiving a PPE rate $R_{PPE}$ provided to the multi-core processing engine 226 by the rate controller 216 via the connection 234 between them. Each PPE is capable of performing various data processing tasks on IP packet header to carry out such data plane tasks as packet processing, packet classification, packet forwarding, etc.

The dispatcher 224 receives IP packet headers from the rate estimator 210, or alternatively it could receive them directly from the packet header extractor 202, and selectively forwards each IP packet header to one of the PPEs. Which PPE is selected for a given IP packet header and the rate at which the forwarding is done for delay tolerant flows $F_D$ will be further explained after the function of the rate controller 216, which affects the selection and rate, is described.

As will be explained later in more detail with reference to FIG. 3, in some cases depending on the aggregate rate $R_A$, the time critical flows aggregate rate $R_T$, the minimum rate $R_{D\_QOS}$, and the optimal rate $R_O$, the rate controller 216 determines a number K of PPEs from which the dispatcher 224 can select a PPE to which it will forward an IP packet header. The rate controller 216 informs the dispatcher 224 of the number K via its connection 222 to the dispatcher 224. The remaining PPEs, of which there will be N–K in number, will not receive any IP packet headers until the number K is increased and will go into an energy conserving idle state via clock gating functionality provided on each of the PPEs. The clock gating function is circuitry that enables a PPE to detect inactivity at its data input, the input which would otherwise be receiving IP packet headers, and disable a clock signal to the PPE in order to minimize power consumption caused by cycling of the clock signal even the absence of data processing operations. In cases where the number K is not determined or sent to the dispatcher 224, the dispatcher 224 will select a PPE from the entire plurality of N PPEs.

Also, as will be explained later in more detail with reference to FIG. 3, in some cases depending on the time critical flows aggregate rate $R_T$, the minimum rate $R_{D\_QOS}$, and the optimal rate $R_O$, the rate controller 216 determines the PPE rate $R_{PPE}$ to be provided to the multi-core processing engine 226. In such cases the rate controller 216 also provides the dispatcher 224 with the minimum rate $R_{D\_QOS}$, or alternatively the minimum rate $R_{D\_QOS}$ can be provided to the dispatcher 224 by the rate estimator 210 for use in such cases. In cases where the PPE rate $R_{PPE}$ is not provided to the multi-core processing engine 226, the optimal rate $R_O$ is used as a default processing rate instead by the PPEs, which optimal rate $R_O$ is provided by the rate controller 216 or alternatively by the previously described means 220 for obtaining the optimal rate $R_O$. In this embodiment the same PPE rate $R_{PPE}$ is provided to each of the PPEs. However, in other embodiments one or more of the PPEs could receive a respective PPE rate that is unique as compared to one or more other PPE rates and of which the dispatcher 224 would be informed to accordingly adjust its corresponding dispatching rate of IP header packets to that PPE.

Returning to operation of the dispatcher 224, the dispatcher 224 is operable to perform fair scheduling of IP packet headers of the delay tolerant traffic flows $F_D$ based on the required minimum rate of each such flow as specified in its corresponding IP packet headers as previously described. If the dispatcher 224 is instructed by the rate controller 216 to perform such scheduling, it will do so keeping the cumulative rate of such flows within the minimum rate $R_{D\_QOS}$. Otherwise, the dispatcher 224 will dispatch the IP packet headers of delay tolerant flows $F_D$ as it receives them. In either case, in this embodiment the dispatcher 224 does not perform scheduling on time critical flows $F_T$, however such scheduling could be done in other embodiments as long as QoS requirements of those flows are met with such scheduling being performed. As for the selection of PPE, the dispatcher 224 selects a PPE to which to forward an IP packet header from either the entire plurality N of PPEs or a subset K of the PPEs, as previously described. The selection is done in a round-robin manner. In cases where one or more PPEs have different processing rates, the dispatcher 224 will select an appropriate PPE for a given IP packet header in dependence upon the processing rates of available PPEs in a current round-robin cycle and the required minimum rate of the flow to which IP packet header belongs.

The packet aggregator 238 receives processed IP packet headers from the multi-core processing engine 226 and IP packets from the packet buffer via a connection 242 thereto, and rebuilds each IP packet by replacing its existing IP packet header with a corresponding processed IP packet header. The packet aggregator 238 then outputs the resulting processed IP packets, for example to a router switching fabric for routing or to another network processor for further processing.

It should be noted that the functionality provided by the packet buffer 212 could be performed by the packet aggregator 238, or if the dispatcher 224 dealt with entire IP packets and not just IP packet headers as previously described, the packet buffer 212 would not be needed. Furthermore, the functionality provided by packet aggregator 238, either enhanced with the packet buffer 212 functionality or not, could be performed by the multi-core processing engine 226. Still further, a controller for a network processor having a plurality of packet processing engines could include merely the rate estimator 210, the rate controller 216, and the dispatcher 224. In that case and if the controller dealt with entire IP packets, the functionality of the packet header extractor 202, packet buffer 212, and packet aggregator 238 would not be required.

Figure 3:
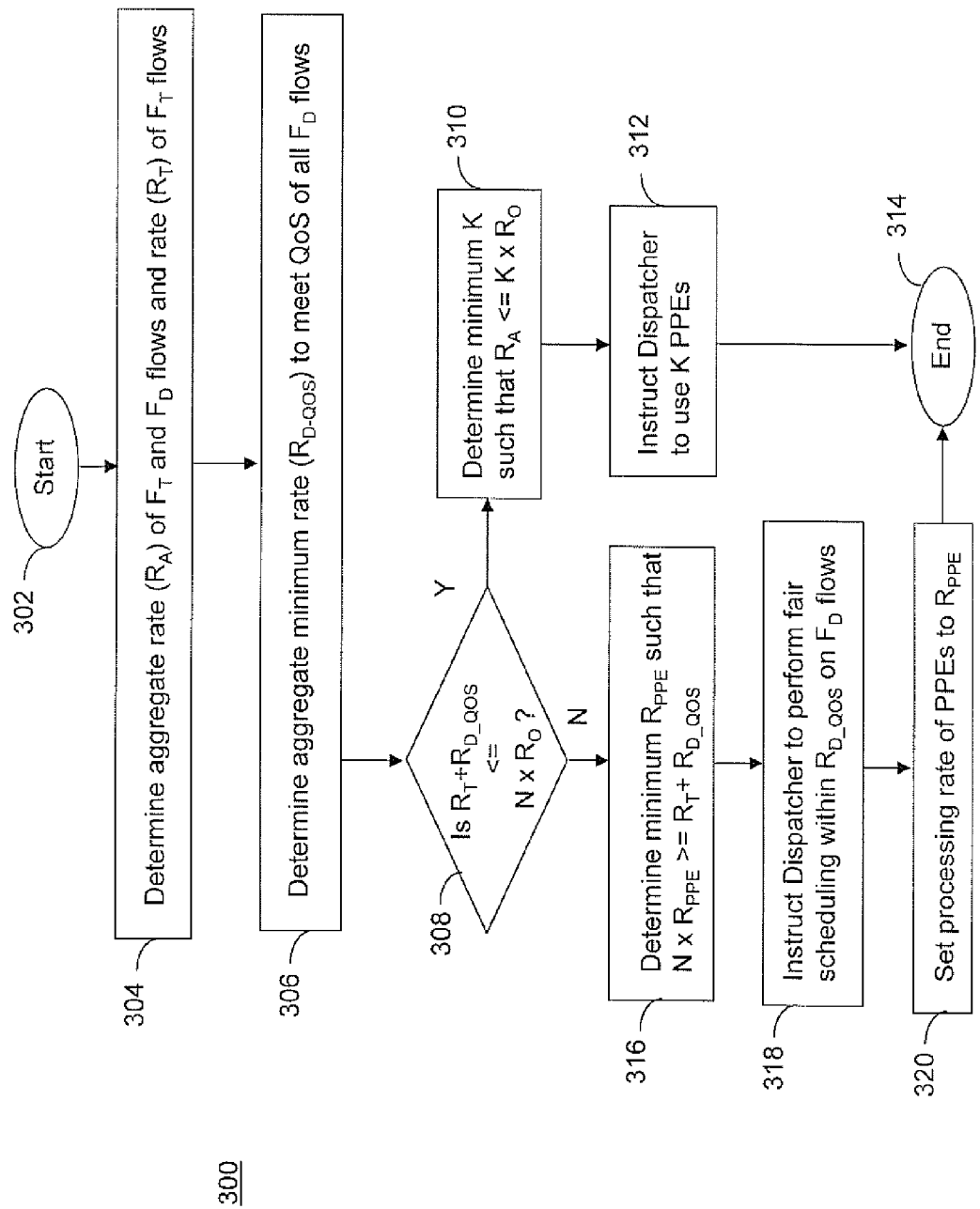
FIG. 3 illustrates a method of controlling a processing rate used in the network processor of FIG. 2.

With reference to FIG. 3, a method 300 of controlling processing rate used in the network processor 200 will now be described. After starting 302, the method 300 determines 304 the rate $R_T$ of the time critical flows and the aggregate rate $R_A$ of the delay tolerant and time critical flows received by the network processor. Next, the method 300 determines 306 the aggregate minimum rate $R_{D\_QoS}$ that will meet the QoS requirements of all the delay tolerant flows $F_D$. It should be noted that the order of these determinations 304, 306 can be reversed without affecting the outcome of the method 300. Next, a determination 308 is made whether or not the rate summation of the rate $R_T$ of time critical flows and the minimum rate $R_{D\_QoS}$ is less than or equal to N times the optimal rate $R_O$, where N is the number of PPEs in the network processor. It should be noted that the aggregate rate $R_A$ is not needed unless the present determination 306 has an affirmative result, so that determination of the aggregate rate $R_A$ could be omitted from the determination 304 and made responsive to the present determination 308 resulting in the affirmative.

If the determination 308 results in the affirmative then a minimum number K of PPEs is determined 310 such that the aggregate rate $R_A$ is less than or equal to K times the optimal rate $R_O$. The dispatcher 224 is then instructed 312 to use a subset of size K PPEs of the plurality of PPEs when selecting a PPE to which to forward an IP packet header. The method 300 then ends 314, however it would typically return to the start 302 after a period of time or responsive to a change in the input flow 204 of IP packets to the network processor.

If the determination 308 results in the negative, a minimum PPE rate $R_{PPE}$ is determined 316 such that N times the minimum PPE rate $R_{PPE}$ is greater the summation of the rate $R_T$ of time critical flows and the minimum rate $R_{D\_QoS}$. The dispatcher 224 is then instructed to perform fair scheduling on the delay tolerant flows according to their respective minimum rates and keeping with the minimum rate $R_{D\_QoS}$. The processing rate of the PPEs is then set 320 to the PPE rate $R_{PPE}$ and the method 300 ends 314. Typically, the method 300 would restart by returning the start 302 after a period of time or responsive to a change in the input flow 204 of IP packets to the network processor.

Advantageously, embodiments of the invention can significantly lower the energy consumption of intermediate routers via QoS-aware processing rate throttling of delay tolerant bulk data transfer. These embodiments can be used with other techniques for lowering energy consumption of bulk data transfers such as lowering physical transmit/receive rates over a communication medium to further improve energy efficiency of delay tolerant bulk data delivery.

Numerous modifications, variations and adaptations may be made to the embodiments of the invention described above without departing from the scope of the invention, which is defined in the claims.

What is claimed is:

1. A method of controlling a processing rate used in a network processor having a plurality of packet processing engines, comprising the steps of:
   determining an aggregate rate of time critical flows received by the network processor;
   determining an aggregate minimum rate that will meet respective quality of service requirements of all delay tolerant flows received by the network processor;
   summing the aggregate rate of time critical flows and the aggregate minimum rate to obtain a summed rate;
   totaling respective optimal rates for energy efficiency of the packet processing engines to obtain a cumulative optimal rate;
   comparing the summed rate to the cumulative optimal rate;
   determining, responsive to the summed rate being greater than the cumulative optimal rate, a respective minimum processing rate for each packet processing engine such that a summation of the minimum processing rates is greater than or equal to the summed rate; and
   scheduling processing of the delay tolerant flows by the packet processing engines to meet the respective quality of service requirements of the delay tolerant flows.

2. The method of claim 1, further comprising the step of:
   determining an aggregate rate of the time critical flows and the delay tolerant flows to obtain an aggregate input rate;
   determining, responsive to the summed rate being less than or equal to the cumulative optimal rate, a minimum subset of packet processing engines such that the aggregate input rate is less than or equal to a summation of the respective optimal rates of the packet processing engines of the subset; and
   scheduling processing of the delay tolerant flows and the time critical flows on only packet processing engines of the subset.

3. The method of claim 1, wherein two or more of the packet processing engines have substantially similar optimal rates for energy efficiency and the step of determining the respective minimum processing rate for each packet processing engine comprises determining a same minimum processing rate for each packet processing engine of the two or more packet processing engines.

4. The method of claim 2, wherein two or more of the packet processing engines have substantially similar optimal rates for energy efficiency and the step of determining the minimum subset of packet processing engines comprises determining a minimum size of the subset using a same optimal rate for each packet processing engine of the two or more packet processing engines.

5. The method of claim 1, wherein the step of scheduling comprises fair scheduling of the delay tolerant flows within the aggregate minimum rate.

6. The method of claim 3, further comprising the step of:
   determining an aggregate rate of the time critical flows and the delay tolerant flows to obtain an aggregate input rate;
   determining, responsive to the summed rate being less than or equal to the cumulative optimal rate, a minimum subset of packet processing engines such that the aggregate input rate is less than or equal to a summation of the respective optimal rates of the packet processing engines of the subset; and scheduling processing of the delay tolerant flows and the time critical flows on only packet processing engines of the subset.

7. The method of claim 6, wherein two or more of the packet processing engines have substantially similar optimal rates for energy efficiency and the step of determining the minimum subset of packet processing engines comprises determining a minimum size of the subset using a same optimal rate for each packet processing engine of the two or more packet processing engines.

8. The method of claim 7, wherein the step of scheduling comprises fair scheduling of the delay tolerant flows within the aggregate minimum rate.

9. The method of claim 8, further comprising returning to the step of determining an aggregate rate of time critical flows responsive to a change the time critical flows received by the network processor.

10. The method of claim 9, further comprising returning to the step of determining the aggregate minimum rate responsive to a change in the delay tolerant flows received by the network processor.

11. The method of claim 10, further comprising returning to the step of determining an aggregate rate of the time critical flows and the delay tolerant flows to obtain an aggregate input rate responsive to a change in either of the time critical flows or the delay tolerant flows.

12. A rate controllable network processor, comprising:
a plurality of packet processing engines;
a rate estimator for determining from a flow of IP packets received by the network processor:
an aggregate rate of time critical flows received by the network processor, and
an aggregate minimum rate that will meet respective quality of service requirements of delay tolerant flows received by the network processor;
a rate controller for determining a respective minimum processing rate for each packet processing engine such that a summation of the minimum processing rates is greater than or equal to a summation of the aggregate rate of time critical flows and the aggregate minimum rate; and
a dispatcher for scheduling processing of the delay tolerant flows by the packet processing engines to meet the respective quality of service requirements of the delay tolerant flows,
wherein each packet processing engine is operable to process packets at its respective minimum processing rate.

13. The network processor of claim 12, wherein:
the rate estimator is operable to determine an aggregate input rate comprising a summation of the aggregate rate of time critical flows and an aggregate rate of the delay tolerant flows and to sum the aggregate rate of time critical flows and the aggregate minimum rate to obtain a summed rate;
the rate controller is operable to obtain respective optimal rates for energy efficiency of the packet processing engines and to total respective optimal rates for energy efficiency of the packet processing engines to obtain a cumulative optimal rate, and to determine, responsive to the summed rate being less than or equal to the cumulative optimal rate, a minimum subset of packet processing engines such that the aggregate input rate is less than or equal to a summation of the respective optimal rates of the packet processing engines of the subset; and
the dispatcher is operable to schedule processing of the delay tolerant flows and the time critical flows on only packet processing engines of the subset.

14. The network processor of claim 13, wherein the dispatcher is further operable to perform fair scheduling of the delay tolerant flows within the aggregate minimum rate.

15. The network processor of claim 14, wherein two or more of the packet processing engines have substantially similar optimal rates for energy efficiency, the rate estimator is further operable to determine a same minimum processing rate for each packet processing engine of the two or more packet processing engines.

16. The network processor of claim 15, wherein two or more of the packet processing engines have substantially similar optimal rates for energy efficiency, the rate controller is further operable to determine the minimum size of the subset using a same optimal rate for each packet processing engine of the two or more packet processing engines.

17. The network processor of claim 16, wherein the rate estimator is further operable to determine the aggregate rate of time critical flows responsive to a change the time critical flows received by the network processor.

18. The network processor of claim 17, wherein the rate estimator is further operable to determine the aggregate minimum rate responsive to a change in the delay tolerant flows received by the network processor.

19. The network processor of claim 18, wherein the rate estimator is further operable to determine the aggregate rate of the time critical flows and the delay tolerant flows responsive to a change in either of the time critical flows or the delay tolerant flows.

20. A controller for a network processor having a plurality of packet processing engines, comprising:
a rate estimator for determining from a flow of IP packets received by the network processor:
an aggregate rate of time critical flows received by the network processor, and
an aggregate minimum rate that will meet respective quality of service requirements of delay tolerant flows received by the network processor;
a rate controller for determining a respective minimum processing rate for each packet processing engine such that a summation of the minimum processing rates is greater than or equal to a summation of the aggregate rate of time critical flows and the aggregate minimum rate; and
a dispatcher for scheduling processing of the delay tolerant flows by the packet processing engines to meet the respective quality of service requirements of the delay tolerant flows.

* * * * *